W. C. PRITCHARD.
WEIGHING SCALE.
APPLICATION FILED AUG. 27, 1917.

1,299,224.

Patented Apr. 1, 1919.
2 SHEETS—SHEET 1.

Inventor
William C. Pritchard
By Lockwood & Lockwood
Attorney

W. C. PRITCHARD.
WEIGHING SCALE.
APPLICATION FILED AUG. 27, 1917.

1,299,224.

Patented Apr. 1, 1919.
2 SHEETS—SHEET 2.

Inventor
William C. Pritchard
By Lockwood & Lockwood
Attorney

UNITED STATES PATENT OFFICE.

WILLIAM C. PRITCHARD, OF LANCASTER, PENNSYLVANIA, ASSIGNOR TO THE NATION STORE SPECIALTY COMPANY, OF LANCASTER, PENNSYLVANIA, A CORPORATION OF PENNSYLVANIA.

WEIGHING-SCALE.

1,299,224.  Specification of Letters Patent.  Patented Apr. 1, 1919.

Application filed August 27, 1917. Serial No. 188,456.

*To all whom it may concern:*

Be it known that I, WILLIAM C. PRITCHARD, a citizen of the United States, and a resident of Lancaster, county of Lancaster, and State of Pennsylvania, have invented a certain new and useful Weighing-Scale; and I do hereby declare that the following is a full, clear, and exact description thereof, reference being had to the accompanying drawings, in which like letters refer to like parts.

The object of this invention is to improve the construction and operation of computing weighing scales of the pendulum type, whereby the indicator bearing is relieved from the weight of the pendulum and the associated mechanism and thus the life of said bearing is prolonged and the accuracy of operation of said indicator is promoted; and also the operative parts are housed within the housing so as to render them inaccessible for improper adjustment, after the scale has been sealed; and to enable the pendulum, the chief adjusting means, to be reached by opening the housing at a point from which the remainder of the mechanism cannot be reached for improper manipulation.

Figure 1:
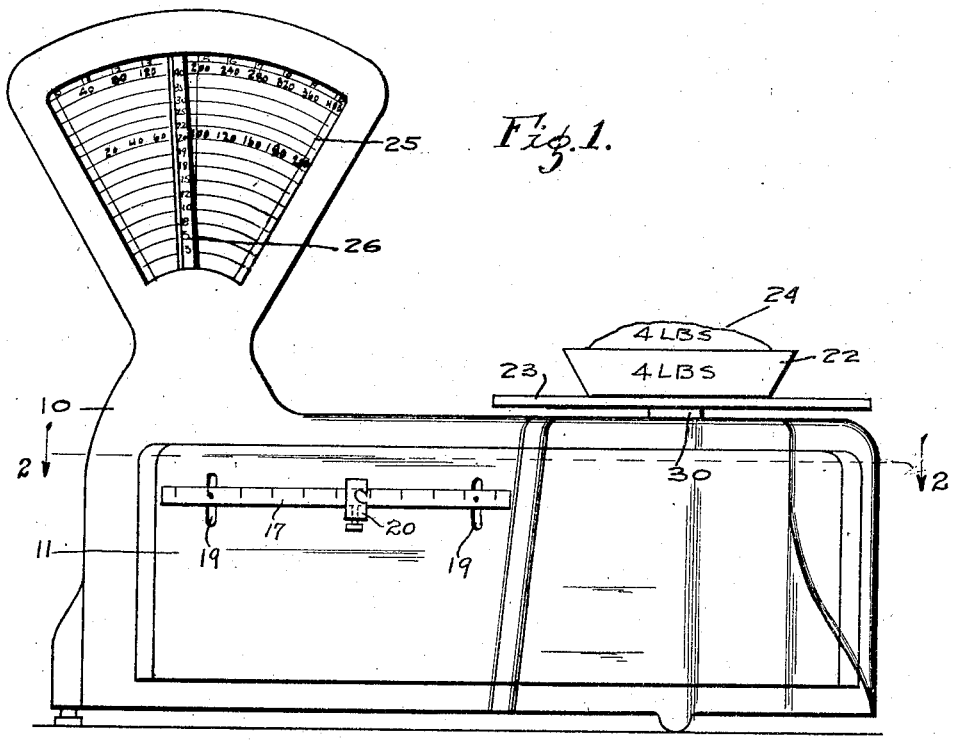
Figure 2:
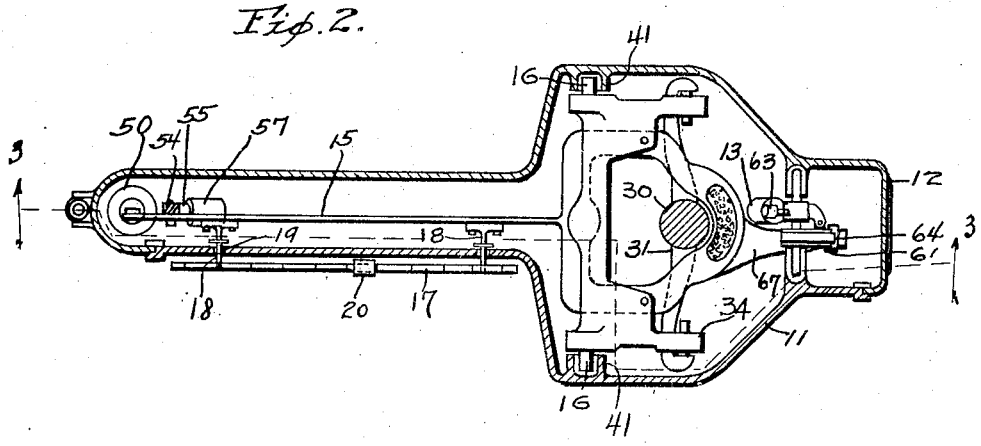
Figure 3:
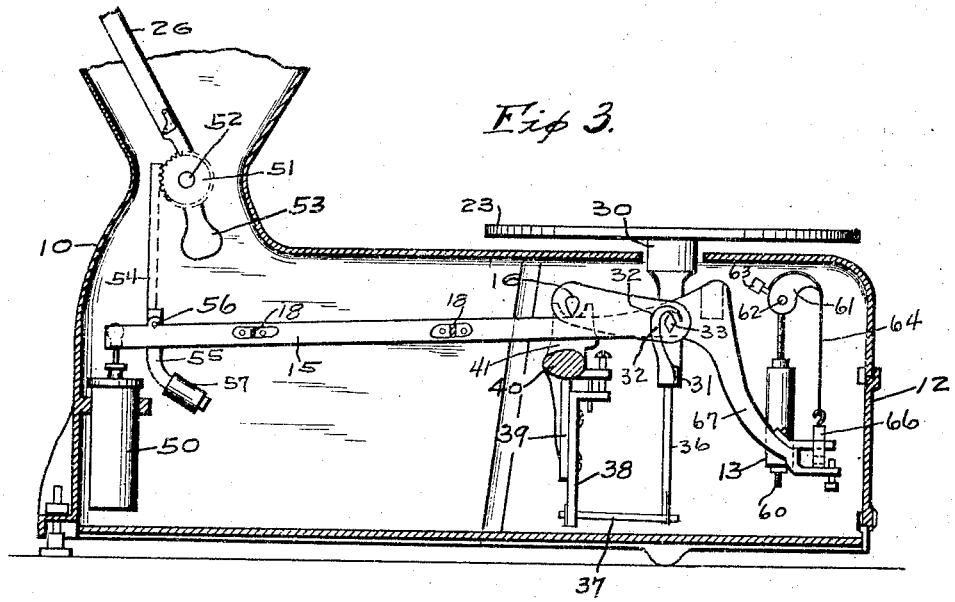
Figure 4:
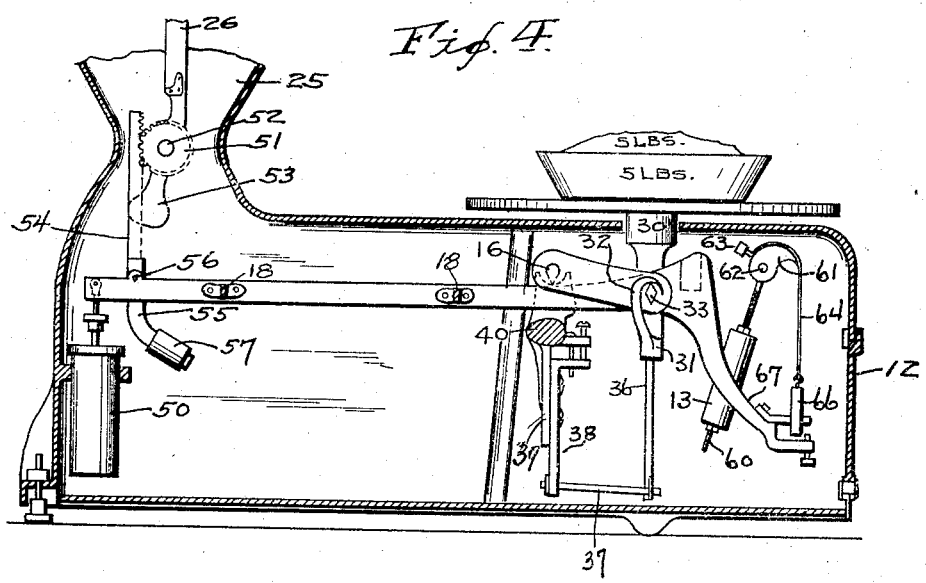

The full nature of the invention will be understood from the accompanying drawings and the following description and claims:

In the drawings, Figure 1 is a front elevation of said scale. Fig. 2 is a horizontal section on the line 2—2 of Fig. 1. Fig. 3 is a vertical central longitudinal section through said scale, the fan-shaped upper part of the housing being partly broken away and showing the parts at zero. Fig. 4 is the same with the parts in position with a five-pound load in the receptacle.

There is shown herein a housing 10 with the upper part fan-shaped. The upper part of the housing may be in any desired shape or adapted for a barrel type of scale, as is familiar to those skilled in the art, without affecting in any wise this invention. The lower part of the housing, however, incloses the operative mechanism of the machine so as to render the same inaccessible, if desired, after the machine is sealed. And to that end the housing has a removable front plate 11 and also a small opening closed by a removable section 12 at the right-hand end through which the pendulum 13 can be adjusted for making the scale balance accurately. But the opening closed by the removable plate 12 is small and at one end of the housing so as to render the remainder of the mechanism practically inaccessible through said opening and the plates 11 and 12 are locked or sealed.

Within the housing there is a weighing beam 15 with the outer portion widened and fulcrumed in the housing by knife edge bearings 16, as usual, and the inner end narrow and may be of any form desired. Since this beam 15 is inaccessible from the outside a tare beam 17 outside the housing is secured to the weighing beam 15 by arms 18 which extend through vertical slots 19 in the housing, a poise 20 slides on the tare beam. It may be used as a tare poise to offset the tare weight of a receiving vessel 22 on the platform 23 and the vessel contains a load 24; or, as a weighing poise for indicating, in coöperation with a chart 25 and indicator 26 in the fan-shaped portion of the housing, the weight of the load, where that weight is greater than ten pounds or the maximum weight for which said chart is adapted.

The platform may be of any type and is supported centrally by a hollow post 30 which is rigidly connected at its lower end with a cross member 31 having at each end upwardly extending hangers 32 suspended upon the knife edge bearings 33 which are secured by the ears 34 forming a part of the widened portion of the weighing beam 15. The platform is mounted outwardly on the weighing beam beyond the fulcrum 16. A check rod 36 extends centrally downward from the cross member 31 and is pivotally connected with a check link 37 at its lower end and said horizontal bar is pivoted to a check bar 38 vertically adjustable on a downwardly extending arm 39 from a cross bar 40 which is a part of the housing and from the ends of which the bearings 41 extend upward for supporting the knife edges 16 of the weighing beam. However, this check mechanism may be arranged in any way well known to the art, so far as this invention is concerned.

At the inner end of the weighing beam there is the usual dash pot construction 50. The pivot member 51 for the indicator 26 is mounted on a bearing or rod 52 mounted on proper bearings in the housing and there is a counter-weight 53 for counter balancing the weight of the indicator 26. The bearing member 51, in the form herein shown, is a pinion which is engaged and actuated by a vertical operating rack bar 54. Said rack bar is connected at its lower end to a lever 55 which is fulcrumed to the weighing beam at 56 and extends outward or toward the platform and carries a weight 57 for the purpose of holding the rack bar 54 in operative engagement with the bearing pinion 51 of the indicator 26. However, this invention is not limited to any particular means for enabling the weighing beam to operate or control the indicating mechanism, whatever that may be, and whether the scale be of fan-shape or barrel-shape so well known in the art.

In pendulum weighing scales heretofore, the pendulum has been mounted in connection with the hub or bearing of the indicator, and, therefore, near the inner end of the weighing beam and so as to more or less directly influence the indicator and the inner end of the weighing beam, or be more or less directly influenced thereby. In this invention the pendulum 13 is placed at the other end of the weighing beam and outer end of the housing. It is adjustable on a rod 60 which is rigidly secured to a hub mounted on a pivot rod 62 mounted in the housing. The cam 61 is also adjustably mounted on the pivot rod 62 and is counterbalanced, as usual, by a weight 63 and a metal ribbon 64 is secured to the cam and extends over the upper surface of the cam and down to a connecting means 66, whereby it is connected with an arm 67 extending downwardly and outwardly from the outer end of the scale beam. This arm 67 is herein shown integral with the weighing beam and a part thereof.

The operation is as follows:

In idle position, the indicator 26 is at the left-hand limit of movement, and the inner end of the weighing beam is in its downward limit of movement, held in this position by the initial tension of the pendulum 13. The inner end of said weighing beam is over-weighted for the purpose of normally counterbalancing the weight of the platform. When a load is placed upon the platform 23, the inner end of the scale beam rises and through the rack bar 54 and weighing pinion 51, moves the indicator 27 in proportion to the weight of the applied load. The weighing beam is of the first principle of leverage and, as the load is applied, the platform descends and depresses the outer end of the weighing beam and elevates the inner end, as explained.

The pendulum 13 hangs normally in nearly a vertical position. As the load is applied, the outer end of the weighing beam, and, therefore, the arm 67, descends, and said arm acting through the ribbon 64 and cam 61, swings the pendulum 13 to the left and to an elevated position with a variable force increasing as the pendulum is elevated. The pendulum, upon the load being applied, constantly tends to resist the effect of the applied load and it also tends to return the indicator to its normal position. The resistance of the pendulum increases in proportion to the load applied.

The invention claimed is:

1. A weighing scale including a weighing beam, a swinging indicating means, a weighted operative connection between the indicator and one end of the weighing beam for the beam to control the indicator, an adjustable pendulum connected with the other end of the beam and arranged to afford a variable resistance to the movement of the beam under the influence of an applied load, a housing entirely inclosing said beam, indicator operating means and pendulum, said housing having an opening in one side wall thereof through which said parts may be introduced into the housing, and an opening in one end thereof to give access to the pendulum for its adjustment, and a removable cover for said end opening.

2. A weighing scale including a weighing beam fulcrumed between its ends, one end of said beam being bent downwardly a distance and then forwardly a distance in a horizontal plane, a load receiving platform mounted thereon at one side of the fulcrum, a pivotally mounted indicator, a pinion at the pivoted end of said indicator, a rack pivoted to said beam and engaging said pinion, a counter-weight for holding the rack in engagement with the pinion, and a pendulum connected with the horizontally extending downwardly bent end of the beam and arranged to afford a variable resistance to the movement of the beam under the influence of an applied load.

3. A weighing scale including a weighing beam fulcrumed between its ends, said weighing beam being widened at its fulcrum point, a load receiving platform supported thereon at one side of the fulcrum, the end of the weighing beam below the platform being curved downwardly and forwardly, the extreme lower end of said downwardly bent portion being extended in a horizontal plane, the other end of the beam being weighted so as to overbalance the platform, an indicator, a pinion at the pivotal point of the indicator, a rack pivotally connected with the weighted end of the beam, a weight for holding the rack in engagement with the pinion and a pendulum connected with the horizontal portion of the downwardly curved end of the beam and arranged so that it will normally hang downward and will swing upward as the load is applied.

In witness whereof, I have hereunto affixed my signature.

WILLIAM C. PRITCHARD.

Copies of this patent may be obtained for five cents each, by addressing the "Commissioner of Patents, Washington, D. C."

It is hereby certified that the name of the assignee in Letters Patent No. 1,299,224, granted April 1, 1919, upon the application of William C. Pritchard, of Lancaster, Pennsylvania, for an improvement in "Weighing-Scales," should have been written and printed as *The National Store Specialty Company* instead of "The Nation Store Specialty Company," as shown by the records of assignments in this office; and that the said Letters Patent should be read with this correction therein that the same may conform to the record of the case in the Patent Office.

Signed and sealed this 29th day of April, A. D., 1919.

[SEAL.] R. F. WHITEHEAD,

*Acting Commissioner of Patents.*

Cl. 265—62.